United States Patent

Roberts et al.

Patent Number: 5,359,924
Date of Patent: Nov. 1, 1994

[54] COOKING APPLIANCE FOR COOKING A BATTER WRAPPED MEAT PRODUCT ON A STICK

[76] Inventors: Gordon G. Roberts, 38 Camelback, Pleasant Hills, Calif. 94523; Gordon E. Roberts, 9314 S. Gunn, Whittier, Calif. 90605

[21] Appl. No.: 918,500

[22] Filed: Jul. 21, 1992

[51] Int. Cl.⁵ ............................................. A47J 37/12
[52] U.S. Cl. ........................................ 99/416; 99/411; 99/413; 99/431; 99/441
[58] Field of Search .................... 99/353, 381–384, 99/403, 410–417, 426, 431, 441, 448; 126/369; D7/678; 249/78, 79, 81, DIG. 1

[56] References Cited

U.S. PATENT DOCUMENTS

| 374,909 | 12/1887 | Hopper | 99/416 |
| 869,690 | 10/1907 | Brown | 99/426 |
| 2,125,589 | 8/1938 | Shuman | 99/383 |
| 2,267,213 | 12/1941 | Newcomb | 99/383 |
| 2,650,536 | 9/1953 | Russell | 99/448 |
| 2,804,009 | 8/1957 | Holland | 99/384 |
| 3,424,076 | 1/1969 | Bernatz et al. | 99/426 |
| 3,466,999 | 9/1969 | Yanez-Pastor et al. | 99/441 |
| 4,483,240 | 11/1984 | Dinh | 99/448 |
| 4,542,684 | 9/1985 | Cantrell | 99/403 |
| 4,542,685 | 9/1985 | Wilson | 99/413 |

FOREIGN PATENT DOCUMENTS 264521  4/1929  Italy ...................................... 99/415

Primary Examiner—Timothy F. Simone
Attorney, Agent, or Firm—David O'Reilly

[57] ABSTRACT

An appliance for cooking a sausage on a stick embedded in a batter. One or a plurality of cylinders are provided for receiving a cooked sausage skewered on a stick which is then filled with a pancake batter. The cylinders are then submerged in a hot oil for a few minutes to cook the batter to produce a breakfast on a stick. The appliance can be in the form of a plurality of cylinders on a plate or can be individual cylinders. The appliance is provided with hooks or a clip to mount it in a deep fat frying basket for submersion in hot oil, In another embodiment the appliance can be free-standing by surrounding each cylinder with a heating coil.

7 Claims, 3 Drawing Sheets

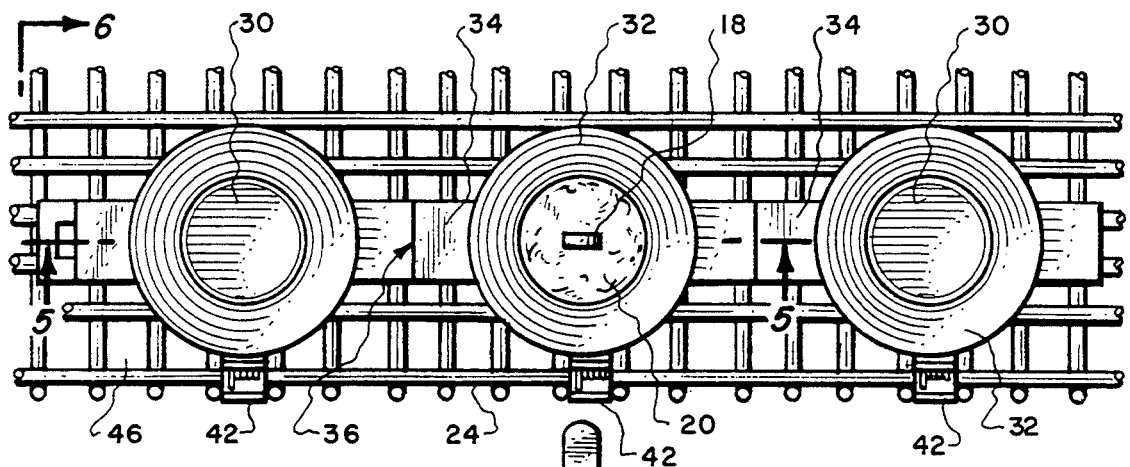
Fig. 4.
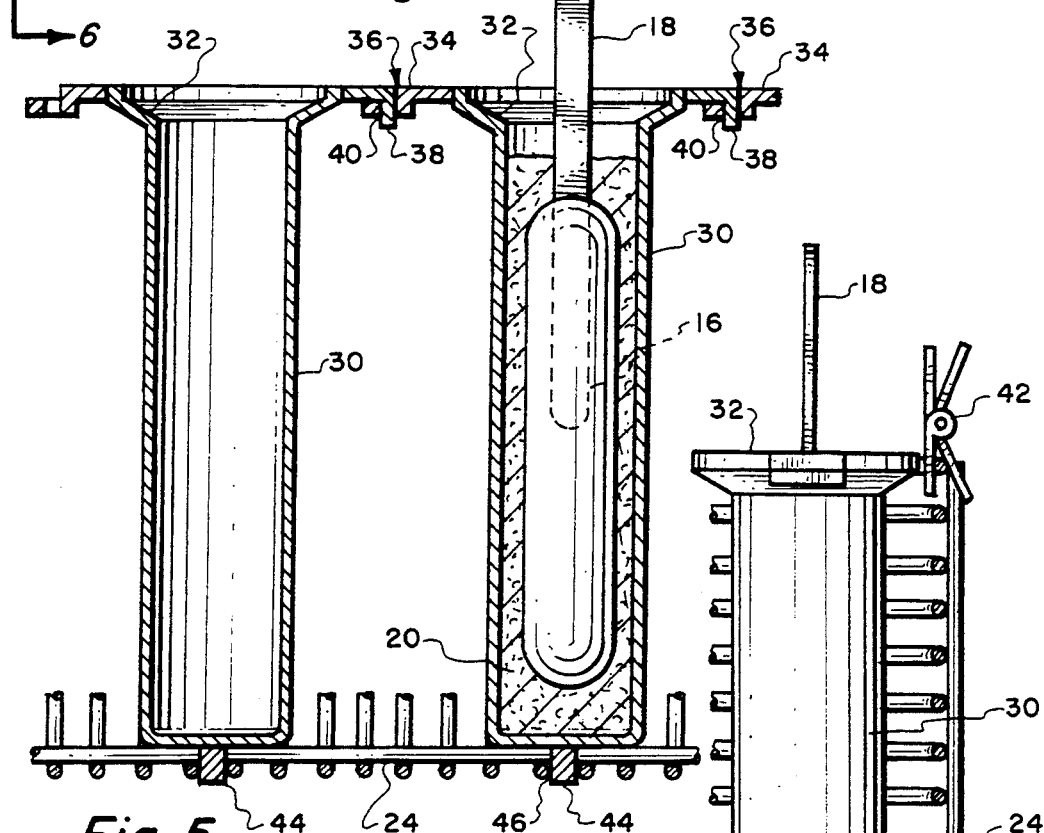
Fig. 5.
Fig. 6.

COOKING APPLIANCE FOR COOKING A BATTER WRAPPED MEAT PRODUCT ON A STICK

FIELD OF THE INVENTION

This invention relates to cooking appliances and more particularly relates to a cooking appliance for cooking a meat product such as a sausage skewered on a stick and embedded in a pancake batter.

BACKGROUND OF THE INVENTION

Fast foods have become increasingly popular and a number of fast food products have been developed in recent years. Also, great attention has been paid to the production of these fast foods with nutrition and health in mind. That is the fast foods should not only be nutritious but should avoid including high cholesterol and fat ingredients and cooking methods if possible. Thus deep fat fried products that are cooked in cooking oils are less desirable.

There is a product that include a frankfurter on a stick that is molded in a corn based batter. These are know as "Corn Dogs". These are produced by piercing a frankfurter or hot dog lengthwise with a stick and then dipping the hot dog in a cornbread batter. The hot dog coated with the batter is then deep fat fried in a cooking oil. The product thus becomes saturated with undesirable fats and cholesterol in addition to the fat and cholesterol already in the hot dog and batter.

There are also machines around to produce a frankfurter rolled in a sandwich for dispensing by coin operated machines. One such device is disclosed and described in U.S. Pat. No. 1,879,146 of Estrin, issued Sep. 27, 1932. In this device a roll is cut and a frankfurter is inserted.

There are also food molding machines that have cylinders for production of food items. One such device is shown in U.S. Pat. No. 4,817,513 that is for producing ice cream cones. In this device, batter is inserted in a mold and a second core is inserted in the mold to form the shell of the cone. Heating elements are included in the device to cook the batter poured into the mold cavity to form the shell of the ice cream cone.

Another device for making pastries such as an ice cream cones is disclosed in U.S. Pat. No. 13,455, issued Aug. 6, 1912 to Lenier et al. In this device a female die having a number of conical cavities for a plurality of cones is formed for receiving batter. A male die having a number of conical inserts equal to the number of cavities in the female die is pressed into the female die to simultaneously form a plurality of shells which are then cooked and removed from the female die.

It one object of the present invention is to provide a device for producing a breakfast food product of a sausage on a stick embedded and cooked in a pancake batter.

Yet another object of the present invention is to provide a cooking appliance for cooking a breakfast item comprised of a sausage mounted on a stick molded into a pancake batter that can be cooked free of any oils or fats.

Still another object of the present invention is to provide a cooking appliance that can be used to cook a sausage mounted on a stick and embedded in a batter easily and quickly.

Yet another object of the present invention is to provide cooking appliance or utensil that allows a breakfast item such as a sausage mounted on a stick and molded in a pancake batter to be cooked in a deep fry basket without contacting the product with any cooking oil.

Another object of the present invention is to provide a cooking appliance for cooking a sausage mounted on a stick embedded in a pancake batter that includes heating coils for cooking the food.

BRIEF DESCRIPTION OF THE INVENTION

The purpose of the present invention is to provide a cooking appliance or utensil for cooking a sausage or a breakfast item such as a sausage on a stick embedded in a pancake batter which allows the sausage to be quickly cooked in the batter and to be free of oils and saturated fats.

The present invention is comprised of a plurality of elongated cylinders mounted on a plate, having a diameters designed to receive a sausage in a stick. The pan is provided with a handle and has a hanger for hanging the pan on the side or end of an existing deep fat frying basket. An upright flange around the rim of the pan prevents the fat from spilling into the pan for cooking sausage on a stick in pancake batter.

Preferably the pan is constructed with six, eight, or more cylinders to cook eight or more sausages on a sticks embedded in pancake batter simultaneously. Preferably each cylinder is slightly tapered and approximately five and one half to six inches long and one to one and a quarter inches in diameter. The cylinders can be slightly tapered from top to bottom to ease removal of the cooked food if desired.

To cook the sausages embedded in pancake batter the stick is first inserted lengthwise through the axis of the sausage approximately half way through the length. A sausage on a stick is then positioned in the center of all or one or more of the cooking cylinders and batter poured in to cover the sausage up to within about an inch of the top of each cylinder. The batter is usually thick enough to hold the sausage and stick in a substantially fixed upright position once the cylinder is completely filled. The cylinder portion of the appliance is then submerged in hot cooking oil approximately up a half inch from the flat pan portion. Preferably the appliance has a handle and a hanger for hanging the appliance on the edge of existing deep fat frying baskets. This will automatically positioned the cooking appliance correctly in the oil.

Also, preferably the surface of the cylinders are coated with a non-stick material such as teflon for easy removal when cooking is completed. After cooking is completed the sausage embedded in the pancake batter are easily removed from the cylinders by a axial force on the stick.

To prevent the appliance cylinders form tipping small bosses designed to fit between the spaces of the wires forming the french fry basket are formed on the end of each cylinder. Thus when mounted on the deep fat frying basket these small bosses fit between the wire web of the basket preventing the appliance from tipping.

Another embodiment of the invention has a plurality of separate cylinders allowing one or a selected number of sausages on a stick to be cooked in a surrounding batter. In this embodiment separate cylinders have clips and a boss on the base end to mount them upright in a deep fat frying basket. The cylinders also include links so they may be joined in to groups for cylinders to cook several "breakfasts on a stick". As before the sausage is skewered on a stick and inserted in a cylinder that is filled with batter and then cooked.

In another embodiment of the invention, electric heating coils are helically wrapped around each cylinder. This allows the device to be used as a free standing appliance. In this embodiment a sausage on a stick is placed in each cylinder which is then filled with pancake batter. The device is then plugged into a standard 120 volt AC outlet to cook the food. The food is removed as before by pulling on the stick by pulling the cooked batter and sausage out of the cylinders.

The above and other novel features of this invention will be more fully understood from the following detailed description and the accompanying drawings in which:

DETAILED DESCRIPTION OF THE DRAWINGS

FIG. 4 is a top view of an optional embodiment of the invention comprised of independent linked cylinders.

FIG. 5 is a sectional view taken at 5—5 of FIG. 4.

FIG. 6 is a view taken at 6—6 of FIG. 5.

Detailed Description of the Invention

Figure 1:
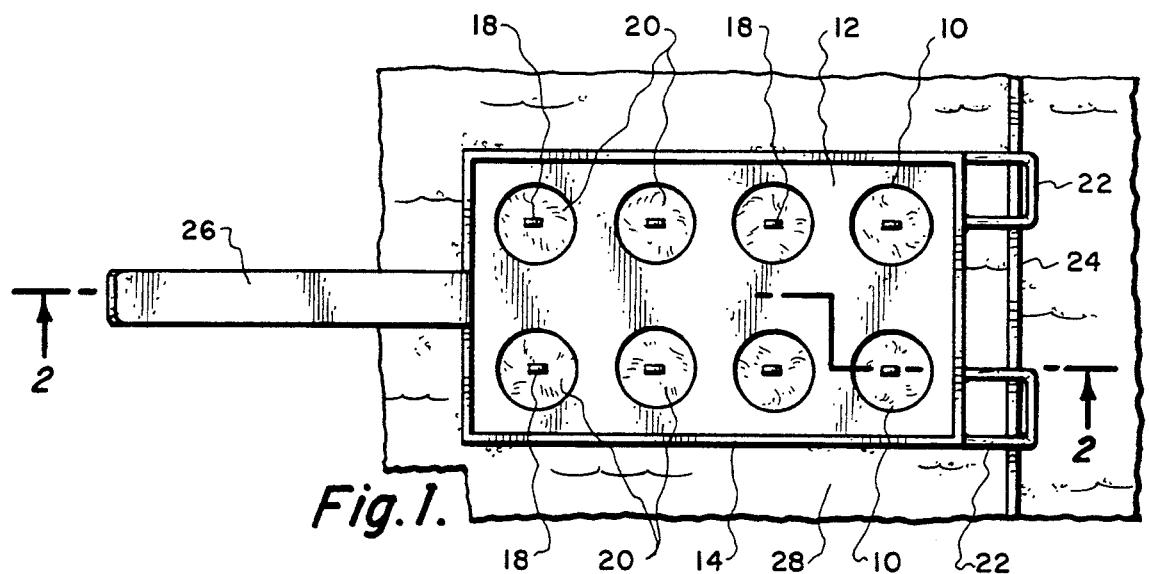
FIG. 1 is a top view of a cooking appliance for cooking a breakfast product according to the invention.
Figure 2:
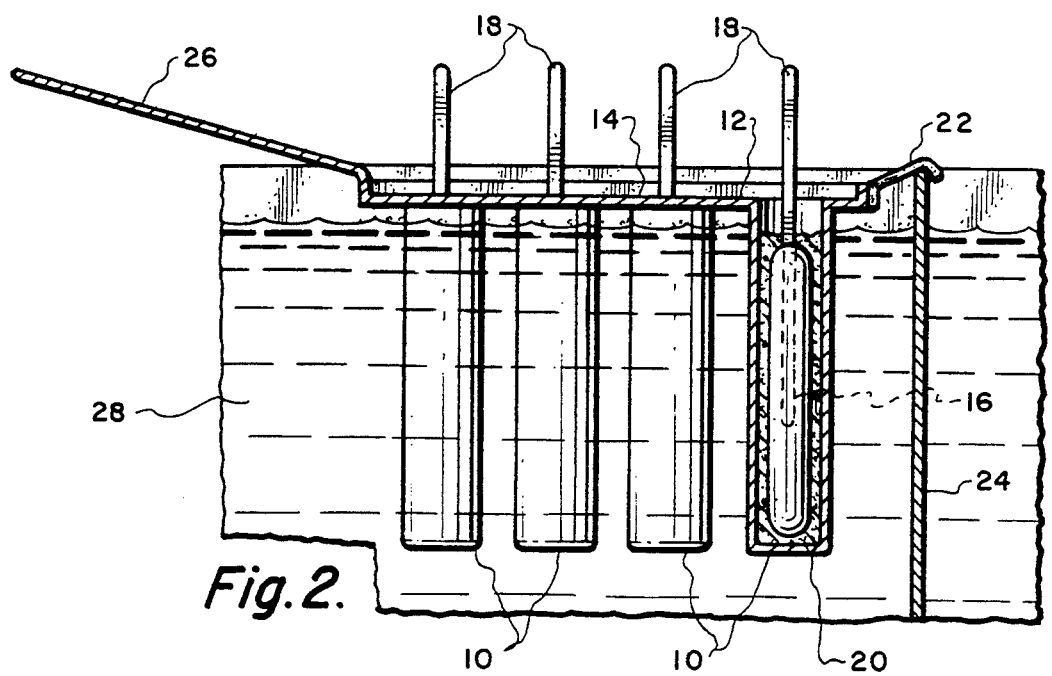
FIG. 2 is a sectional view taken at 2—2 of FIG. 1.
Figure 3:
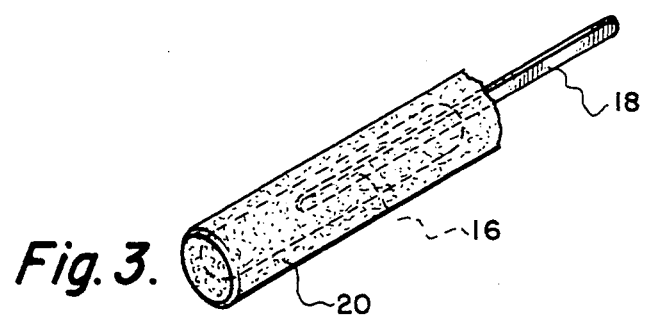
FIG. 3 is a perspective view of a cooked food product according to the invention.

A cooking appliance according to the invention is shown generally in FIGS. 1 and 2 and is comprised of a plurality of cylinders 10 mounted on a plate or pan 12 to hold the cylinders 10 in a spaced upright position. The cylinders are preferably approximately six inches long and have a diameter in the range of 1 to 1¼ inches. Also cylinders 10 can taper slightly inward from top to bottom to ease removal of the cooked food if desired. Another preferred option is to coat all the upper surfaces with a suitable non-stick material such as Teflon. Flange 14 provides a rim around the periphery of pan or plate 12 to prevent batter used in the cooking process from spilling and also prevent cooking oils from mixing with the food product.

The cooking appliance can produce a "breakfast on a stick" comprised of sausage 16 mounted on stick 18 embedded in a batter such as pancake batter 20 filling cylinders 10. Preferably pancake batter 20 fully covers sausage 16 up to about an inch below the top of the cylinders 10. This provides sufficient space to allow the batter to swell when it is being cooked.

To allow the use of the cooking appliance with the existing fast food cooking equipment, hanger 22 is provided for hanging the appliance on standard french fry basket 24 of the wire mesh type design. A handle 26 may or may not be provided as desired to hang the appliance on the french fry basket 24. Handle 26 allows the appliance to be lifted out of the basket without removing the basket from hot oil 28.

To cook the fast food product, a cooked sausage is first skewered lengthwise with stick 18 which preferably extends through the axis of the sausage 16 about half its' length. The sausage and stick is then positioned vertically in the cylinder 10 and pancake batter poured into the cylinder filling it to about one inch from the top fully covering the sausage 16. With the appliance shown, up to eight "breakfast on a stick" food items can be cooked simultaneously.

To cook the sausage in the batter the appliance is submerged in hot oil 28 for a period of about five minutes. The appliance of course can be submerged in the oil and held by some convenient means but is preferably provided with the hanger 22 and handle 26 for use with the existing deep fat frying equipment. Thus the appliance 10 can be hung on the edge of a deep fat frying basket 24 which will then be submerged in the hot oil 28.

When the batter 20 is completely cooked, the appliance is removed from the hot oil 28 and the cooked breakfast on a stick removed from the cylinders by a gentle tug on stick 18.

In another embodiment illustrated in FIGS. 4 through 6 the appliance can be provided as a plurality of linked cylinders 30 having a rim 32 to prevent spillage. Each of the cylinders 30 are joined by a link 34 to provide a series of a plurality of cylinders 30 for making a plurality of "breakfast on a stick" items. The link 34 can be separably joined at 36 by a hinge or any other type of means that can be easily separated.

A suitable hinge 36 is illustrated in FIG. 5 comprised of an extension or tab 38 on one rim 32 of a cylinder 30 that engages a socket 40 on the edge of a rim 32 on an adjacent cylinder 30. Thus a plurality of cylinders can be lined together to make two or more batter covered sausages on a stick.

To cook the product in these cylinders, each cylinder is provided with a clip 42 that can be mounted on the rim or edge of a deep fat fry basket 24. In this manner two or any selected number of sausages on a stick can be cooked in batter as desired. Each cylinder 30 also would preferably include a square or rectangular boss 44 shaped to fit the mesh of deep fat fry basket 24. Boss or lug 44 would engage opening 46 between adjacent wire 48 of basket 24 to maintain cylinders 30 in an upright position, preventing them from tipping.

The linked cylinders 30 of the device shown in FIGS. 4–6 as used in a similar manner to the device shown in FIGS. 1–2. First a cooked sausage 16 is skewered on stick 18 and positioned vertically in cylinder 30. Batter 20 is then poured into the cylinder until it is near the top, leaving some room for expansion. About one inch from the top should be sufficient. With the embodiments shown in FIGS. 4, 5 and 6, one, two or more breakfasts on a stick can be cooked simultaneously. This allows the user to only cook as many as are needed.

With each cylinder 30 filled with a sausage on a stick and batter, the cylinders then can be clipped on basket 24. The cylinders are held vertically by clips 24, 42 clipping the side of basket 24 and lugs or bosses 44 engaging openings 42 between wires 48 forming the mesh of basket 24. The basket 24 is then submerged in hot oil 28 (FIG. 1) as before for approximately five minutes, or slightly more. The period of time for cooking the batter would vary, depending upon the type of batter being used. The basket 24 with the plurality of cylinders attached, can then be easily removed from the fat and the cooked breakfast on a stick removed from cylinders 30.

Figure 7:
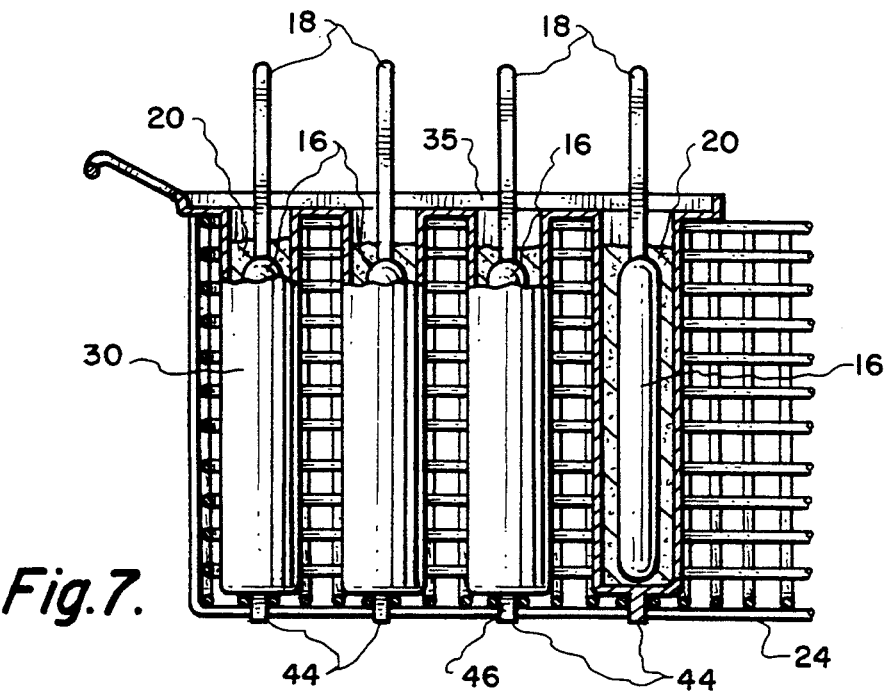
FIG. 7 illustrates an alignment method for maintaining the cooking appliance in an upright position in a deep fat frying basket.

In another optional design shown in FIG. 7 the appliance can be a small group of cylinders assembled on a bar 35. In this embodiment each cylinder 30 is provided with a small square boss 44 on a lower end that fits between the webs 46 of a standard deep fat frying basket 24 as in the embodiment of FIGS. 4–6. This holds the cylinders in a near vertical alignment preventing tipping. Also in this embodiment the cooking appliance 5 can be a series of just four cylinders 30 mounted on bar or rack 35 that hangs on the upper edge of deep fat frying basket 24. Such a design will allow a small group of sausages on a stick to be produced and cooked.

Figure 8:
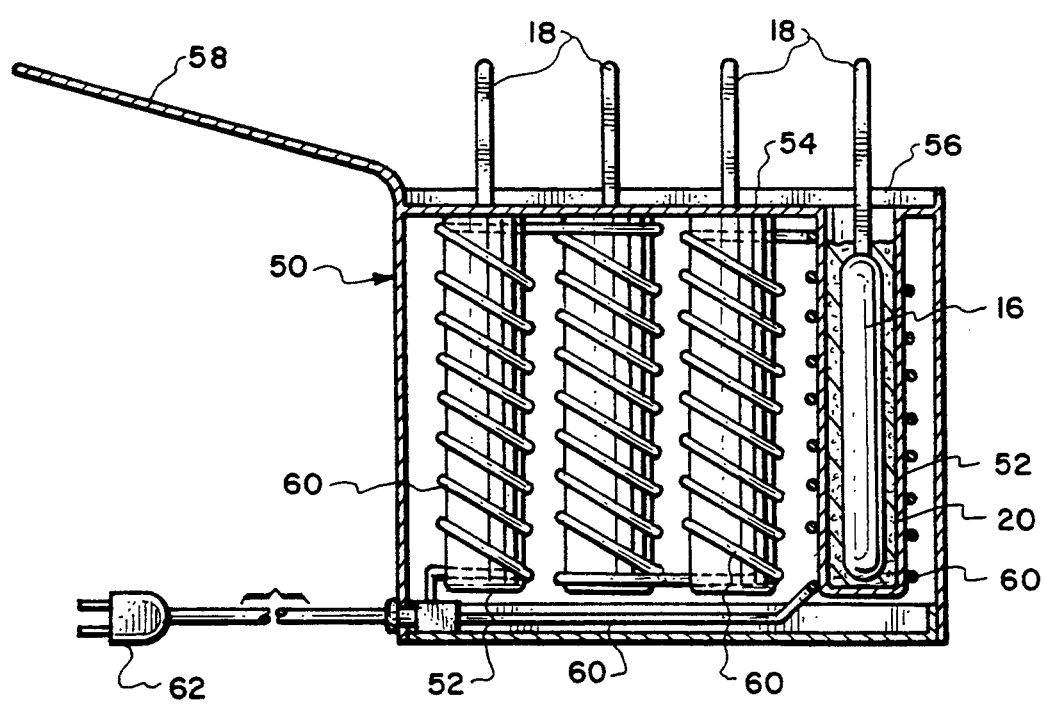
FIG. 8 illustrates an electrically operated cooking appliance for cooking a fast food breakfast item.

The appliance can also be provided as a free standing electric cooking appliance 50 as shown in FIG. 8. In this embodiment cylinders 52 are again mounted on a flat plate 54 and have a peripheral upright flange 56 to prevent spillage. Heating coils 60 encircle each cylinder 52 to provide the heat to cook the food products filling the cylinders. As before handle 58 is provided on the upper end of the appliance 50. Power is applied through 120 volt AC plug 62.

To cook the food product, sausage 16 is skewered with stick 18 as before and inserted in cylinders 52. Batter 20 is then poured into each cylinder to cover the sausage 16. Heat is then applied by inserting plug 62 into an AC socket. When cooking is completed plug 62 is disconnected and the cooked products are easily removed from non-stick cylinders by pulling up on stick 18.

Thus there has been described an appliance for cooking a fast food product comprised of a sausage mounted on a stick embedded in a pancake batter. The appliance can be used with existing deep fat frying equipment such as french frying baskets or can be a free standing electric appliance with a connection for electrical heating to be applied to cook the product.

This invention is not to be limited by the embodiment shown in the drawings and described in the description which is given by way of example and not of limitation but only in accordance with the scope of the appended claims.

What is claimed is:

1. An appliance for cooking a meat product skewered on a stick and covered with a batter in a vat of hot oil comprising;

a plurality of cylinders having a length slightly longer than a meat product skewered on said stick;

plate mounting means for mounting said plurality of cylinders in a vertical position;

hanging means on said plate mounting means for hanging said plate means on a side of a deep fat frying basket so that said vertically oriented cylinders may be partially submerged in said vat of hot oil to heat and cook said batter;

spillage preventing means around said cylinders to prevent said batter from being spilled over the sides of said cylinders when they are being filled;

whereby a meat product on a stick can be surrounded with a batter and cooked.

2. The appliance according to claim 1 in which said spillage prevention means comprises a flange around the periphery of said plate mounting means for mounting said cylinders.

3. The appliance according to claim 1 including lug means on the bottom of each cylinder for engaging the mesh of a deep fat fry basket to maintain said plurality of cylinders in a vertical upright position.

4. An appliance for cooking a meat product skewered on a stick and covered with a batter in a vat of hot oil comprising;

a plurality of cylinders having a length slightly longer than a meat product skewered on said stick, said plurality of cylinders comprising a plurality of individual cylinders joined by interconnecting linking means;

mounting means for mounting said plurality of cylinders in a vertical position, said mounting means comprising hanging means for hanging said plurality of cylinders on a side of a deep fat frying basket so that said vertically oriented cylinders may be partially submerged in said vat of hot oil to heat and cook said batter; and spillage preventing means around said cylinders to prevent said batter from being spilled over the sides of said cylinders when they are being filled;

whereby a meat product on a stick can be surrounded with a batter and cooked.

5. The appliance according to claim 4 in which said hanging means comprises a clip on the side of each cylinder for mounting a plurality of linked cylinders on the side of a deep fat fry basket.

6. The appliance according to claim 4 including lug means on the bottom of each cylinder for engaging the mesh of a deep fat fry basket to maintain said plurality of cylinders in a vertical position.

7. The appliance according to claim 4 in which said spillage prevention means comprises a flange around the periphery of each cylinder; said linking means being formed as an integral part of said flange.

* * * * *